United States Patent
Robertson et al.

(10) Patent No.: US 9,361,107 B2
(45) Date of Patent: *Jun. 7, 2016

(54) MICROCODE-BASED CHALLENGE/RESPONSE PROCESS

(75) Inventors: Ian Robertson, Waterloo (CA); Roger Paul Bowman, Kitchener (CA); Robert Henderson Wood, Waterloo (CA)

(73) Assignee: BlackBerry Limited, Waterloo (CA)

( * ) Notice: Subject to any disclaimer, the term of this patent is extended or adjusted under 35 U.S.C. 154(b) by 755 days.

This patent is subject to a terminal disclaimer.

(21) Appl. No.: 13/179,137

(22) Filed: Jul. 8, 2011

(65) Prior Publication Data

US 2012/0011346 A1   Jan. 12, 2012

Related U.S. Application Data

(60) Provisional application No. 61/362,822, filed on Jul. 9, 2010.

(51) Int. Cl.
*G06F 9/30* (2006.01)
*G06F 9/22* (2006.01)
*G06F 21/30* (2013.01)
*H04L 29/06* (2006.01)

(52) U.S. Cl.
CPC ............ *G06F 9/30178* (2013.01); *G06F 9/223* (2013.01); *G06F 21/30* (2013.01); *H04L 63/08* (2013.01)

(58) Field of Classification Search
CPC ..... G06F 9/30178; G06F 9/223; G06F 21/30; H04L 63/08
USPC ..................................................... 712/42, 208
See application file for complete search history.

(56) References Cited

U.S. PATENT DOCUMENTS

| | | | |
|---|---|---|---|
| 5,946,497 A | 8/1999 | Lee et al. | |
| 6,026,293 A | 2/2000 | Osborn | |
| 6,236,727 B1 * | 5/2001 | Ciacelli et al. | 380/212 |
| 6,542,981 B1 * | 4/2003 | Zaidi et al. | 712/2 |
| 6,704,872 B1 * | 3/2004 | Okada | 713/194 |
| 7,031,391 B1 * | 4/2006 | Riffee | 375/240.27 |
| 7,098,790 B2 * | 8/2006 | Hisano | 340/568.1 |
| 7,538,722 B2 * | 5/2009 | Thandu et al. | 342/357.74 |
| 7,603,556 B2 | 10/2009 | Brown et al. | |
| 7,610,494 B2 * | 10/2009 | Ekkizogloy et al. | 713/189 |

(Continued)

FOREIGN PATENT DOCUMENTS

| | | |
|---|---|---|
| EP | 0707270 | 4/1996 |
| EP | 1376305 | 1/2004 |

(Continued)

OTHER PUBLICATIONS

Random House Dictionary, ©2013, dictionary.com search term: "challenge".*

(Continued)

*Primary Examiner* — Benjamin Geib
(74) *Attorney, Agent, or Firm* — Ridout & Maybee LLP

(57) ABSTRACT

Augmented processor hardware contains a microcode interpreter. When encrypted microcode is included in a challenge from a service requiring authentication, the microcode may be passed to the microcode interpreter. Based on decryption and execution of the microcode taking place at the processor hardware, tampering by potentially abusive device software may be avoided.

19 Claims, 6 Drawing Sheets

(56) References Cited

U.S. PATENT DOCUMENTS

| | | | |
|---|---|---|---|
| 7,757,098 B2* | 7/2010 | Brannock et al. | 713/187 |
| 7,775,427 B2* | 8/2010 | Buer | 235/380 |
| 8,099,772 B2* | 1/2012 | Takada et al. | 726/10 |
| 8,316,243 B2* | 11/2012 | Henry et al. | 713/189 |
| 2003/0196096 A1* | 10/2003 | Sutton | 713/181 |
| 2004/0170068 A1 | 9/2004 | Williams | |
| 2006/0094405 A1* | 5/2006 | Dupont | 455/414.1 |
| 2006/0094411 A1* | 5/2006 | Dupont | 455/417 |
| 2006/0156008 A1* | 7/2006 | Frank | 713/176 |
| 2006/0226996 A1* | 10/2006 | Hisano | 340/586 |
| 2008/0232586 A1* | 9/2008 | Takada et al. | 380/255 |
| 2009/0083833 A1 | 3/2009 | Ziola et al. | |
| 2009/0119754 A1* | 5/2009 | Schubert | 726/4 |
| 2009/0138709 A1 | 5/2009 | Ekkizogloy et al. | |
| 2009/0282263 A1 | 11/2009 | Khan et al. | |
| 2011/0030040 A1* | 2/2011 | Ronchi et al. | 726/5 |
| 2011/0035813 A1* | 2/2011 | Trantham | 726/34 |
| 2011/0144803 A1* | 6/2011 | Egawa | 700/245 |
| 2012/0008766 A1 | 1/2012 | Robertson et al. | |
| 2012/0011345 A1 | 1/2012 | Robertson et al. | |

FOREIGN PATENT DOCUMENTS

| | | |
|---|---|---|
| EP | 1560098 | 8/2005 |
| WO | 9926123 | 5/1999 |
| WO | 02103495 | 12/2002 |

OTHER PUBLICATIONS

EPO, Extended European Search Report relating to application No. 10169019.6 dated Dec. 8, 2010.

Taiwan Allowance Decision with Search Report, Application No. 100124491, Dated Jan. 27, 2014.

* cited by examiner

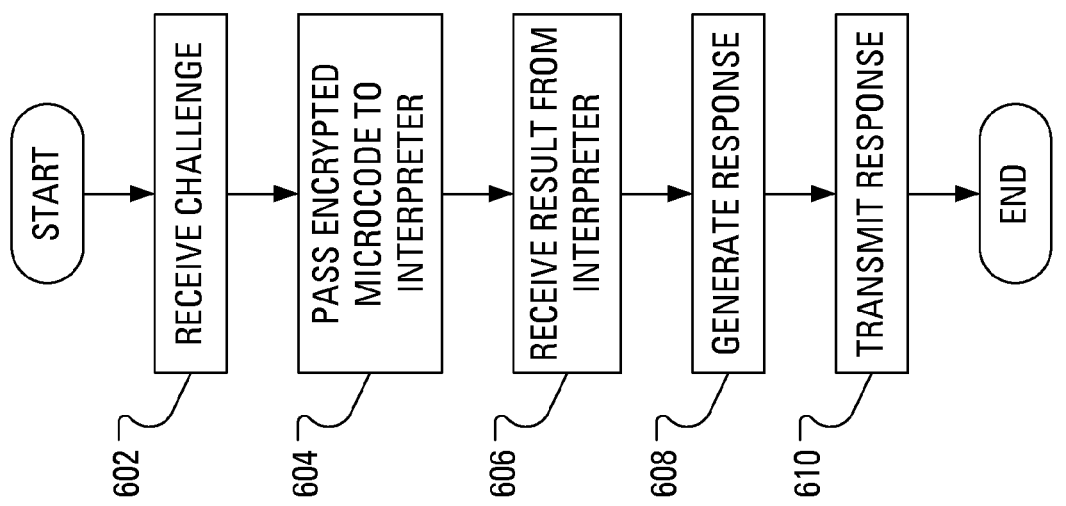

MICROCODE-BASED CHALLENGE/RESPONSE PROCESS

CROSS-REFERENCE TO RELATED APPLICATIONS

The present application claims priority to U.S. Provisional Patent Application 61/362,822, filed Jul. 9, 2010, the contents of which are hereby incorporated herein by reference.

FIELD

The present application relates generally to device security and, more specifically, to securing components prior to manufacture of devices and, even more specifically, to a microcode-based challenge/response process.

BACKGROUND

There was a time when a manufacturer directly controlled production of each component that would later be combined into a single device. indeed, often all components and the single device could be manufactured under the same roof. However, when the device is a complex electronic device, the practicality and cost savings of sourcing the manufacture of myriad components of the device to multiple manufacturers becomes more attractive. Even if security concerns are present, especially in the manufacture of the final device from all of the components. Copycat or counterfeit devices can be an unfortunate result of failing to secure steps along the manufacturing path.

BRIEF DESCRIPTION OF THE DRAWINGS

Reference will now be made, by way of example, to the accompanying drawings which show example implementations; and in which:

FIG. 6 illustrates example steps in a method of generating a response to a challenge.

DETAILED DESCRIPTION

Augmented processor hardware contains a microcode interpreter. When encrypted microcode is included in a challenge from a service requiring authentication, the microcode may be passed to the microcode interpreter. Based on decryption and execution of the microcode taking place at the processor hardware, tampering by potentially abusive device software may be avoided.

According to an aspect of the present disclosure, there is provided a method of responding to a challenge. The method includes receiving a challenge, the challenge including a block of microcode, passing the block of microcode to a microcode interpreter, receiving a result of execution of the microcode, based on the result, generating a response and transmitting the response. In other aspects of the present application, a processor is provided for carrying out this method and a computer readable medium is provided for adapting a processor to carry out this method.

Other aspects and features of the present disclosure will become apparent to those of ordinary skill in the art upon review of the following description of specific implementations of the disclosure in conjunction with the accompanying figures.

The production of consumer goods often requires coordination of disparate manufacturing facilities that produce components of the finished product and delivery of the components to a final manufacturing facility where the final product is produced by assembling the components.

Figure 1:
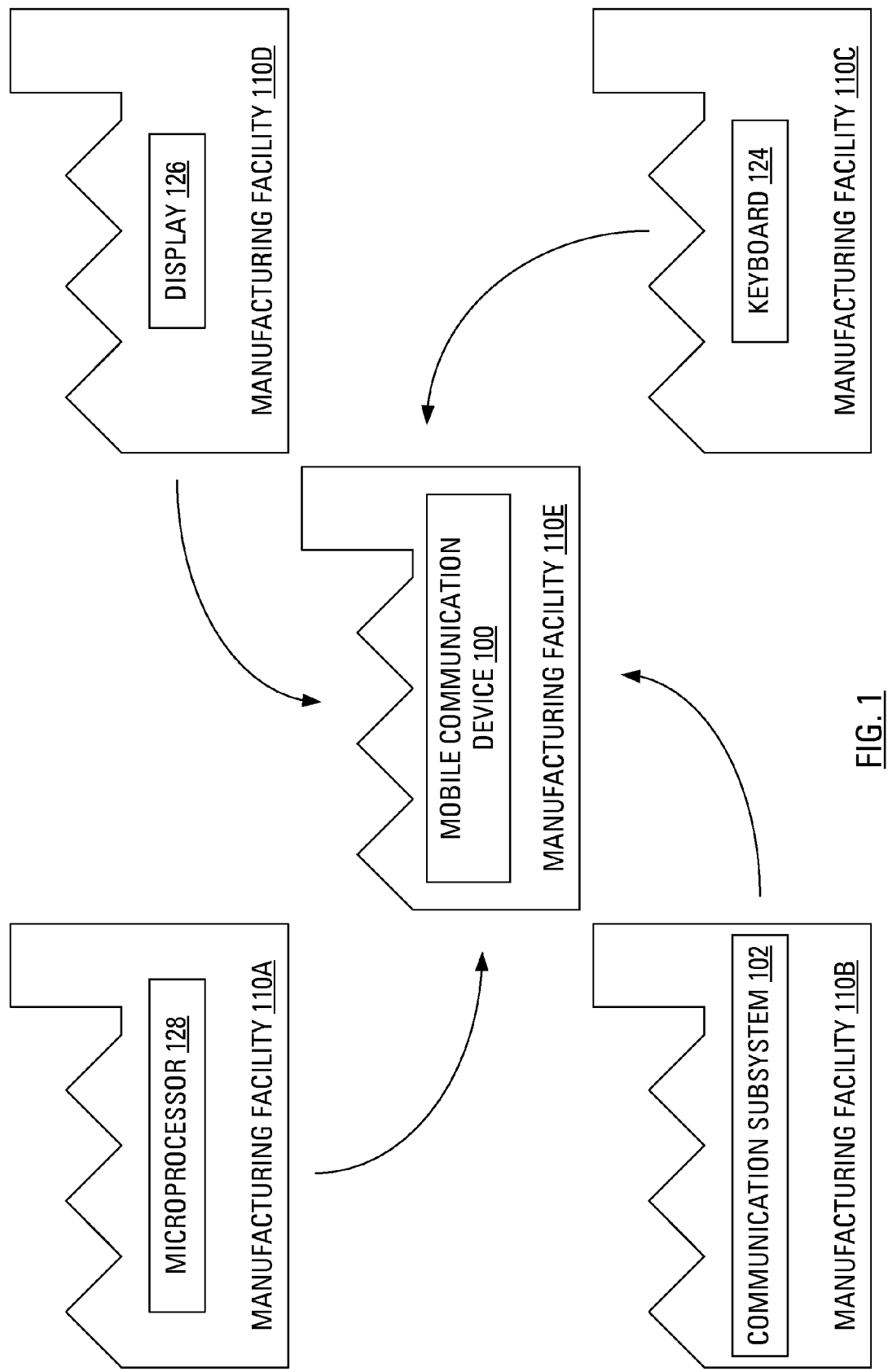
FIG. 1 schematically illustrates a distributed manufacturing process for an example consumer product.

See FIG. 1, which schematically illustrates a distributed manufacturing process for an example consumer product, namely, a mobile communication device 100. A first manufacturing facility 110A produces a processor 128, a second manufacturing facility produces a communication subsystem 102, a third manufacturing facility 110C produces a keyboard 124 and a fourth manufacturing facility 11D produces a display 126. A fifth manufacturing facility 110E receives the components output from the other manufacturing facilities 110A, 110B, 110C, 110D and components from many additional manufacturing facilities, and produces the mobile communication device 100.

Figure 2:
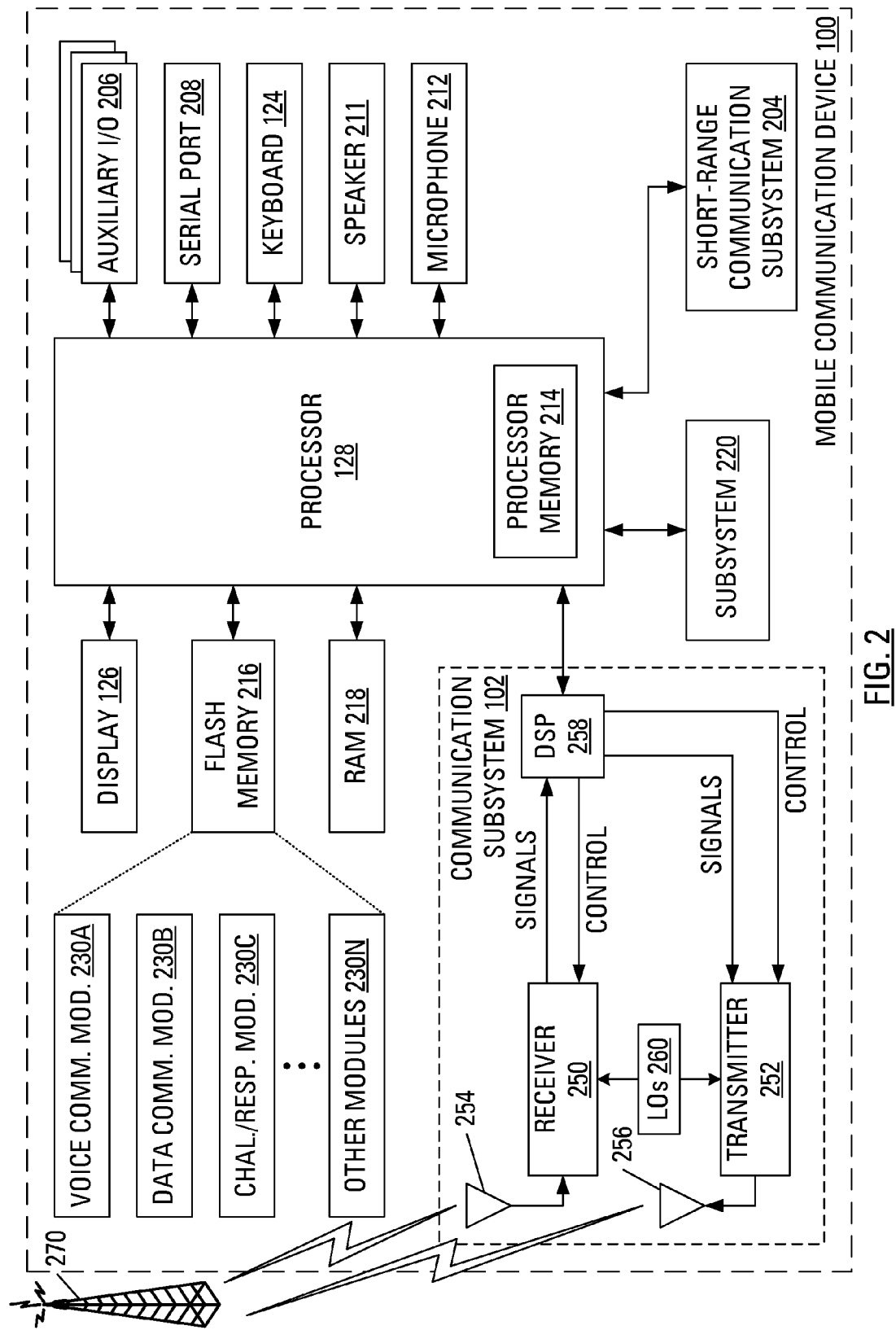
FIG. 2 illustrates an example schematic configuration of the mobile communication device of FIG. 1, according to an implementation of the present disclosure.

An example schematic configuration of the mobile communication device 100 is illustrated in FIG. 2.

The mobile communication device 100 includes a housing, an input device (e.g., a keyboard 124 having a plurality of keys) and an output device (e.g., a display 126), which may comprise a full graphic, or full color, Liquid Crystal Display (LCD). In some embodiments, the display 126 may comprise a touchscreen display. In such embodiments, the keyboard 124 may comprise a virtual keyboard. Other types of output devices may alternatively be utilized. A processing device (the processor 128) is shown schematically in FIG. 2 as coupled between the keyboard 124 and the display 126. The processor 128 controls the operation of the display 126, as well as the overall operation of the mobile communication device 100, in part, responsive to actuation of the keys on the keyboard 124 by a user. The processor 128 includes a processor memory 214.

The housing may be elongated vertically, or may take on other sizes and shapes (including clamshell housing structures). In the case in which the keyboard 124 includes keys that are associated with at least one alphabetic character and at least one numeric character, the keyboard 124 may include a mode selection key, or other hardware or software, for switching between alphabetic entry and numeric entry.

In addition to the processor 128, other parts of the mobile communication device 100 are shown schematically in FIG. 2. These may include a communications subsystem 102, a short-range communications subsystem 204, the keyboard 124 and the display 126. The mobile communication device 100 may further include other input/output devices, such as a set of auxiliary I/O devices 206, a serial port 208, a speaker 211 and a microphone 212. The mobile communication device 100 may further include memory devices including a flash memory 216 and a Random Access Memory (RAM) 218 and various other device subsystems 220. The mobile communication device 100 may comprise a two-way radio frequency (RF) communication device having voice and data communication capabilities. In addition, the mobile communication device 100 may have the capability to communicate with other computer systems via the Internet.

Operating system software executed by the processor 128 may be stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device may also be stored to the RAM 218.

The processor 128, in addition to its operating system functions, enables execution of software applications on the mobile communication device 100. A predetermined set of software applications that control basic device operations, such as a voice communications module 230A and a data communications module 230B, may be installed on the mobile communication device 100 during manufacture. A challenge/response module 230C may also be installed on the mobile communication device 100 during manufacture, to implement aspects of the present disclosure. As well, additional software modules, illustrated as an other software module 230N, which may be, for instance, a PIM application, may be installed during manufacture. The PIM application may be capable of organizing and managing data items, such as e-mail messages, calendar events, voice mail messages, appointments and task items. The PIM application may also be capable of sending and receiving data items via a wireless carrier network 270 represented by a radio tower. The data items managed by the PIM application may be seamlessly integrated, synchronized and updated via the wireless carrier network 270 with the device user's corresponding data items stored or associated with a host computer system.

Communication functions, including data and voice communications, are performed through the communication subsystem 102 and, possibly, through the short-range communications subsystem 204. The communication subsystem 102 includes a receiver 250, a transmitter 252 and one or more antennas, illustrated as a receive antenna 254 and a transmit antenna 256. In addition, the communication subsystem 102 also includes a processing module, such as a digital signal processor (DSP) 258, and local oscillators (LOs) 260. The specific design and implementation of the communication subsystem 102 is dependent upon the communication network in which the mobile communication device 100 is intended to operate. For example, the communication subsystem 102 of the mobile communication device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), etc. Other types of data and voice networks, both separate and integrated, may also be utilized with the mobile communication device 100.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore uses a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the mobile communication device 100 may send and receive communication signals over the wireless carrier network 270. Signals received from the wireless carrier network 270 by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals to be transmitted to the wireless carrier network 270 are processed (e.g., modulated and encoded) by the DSP 258 and are then provided to the transmitter 252 for digital to analog conversion, frequency up conversion, filtering, amplification and transmission to the wireless carrier network 270 (or networks) via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as a text message or web page download, is processed by the communication subsystem 102 and is input to the processor 128. The received signal is then further processed by the processor 128 for output to the display 126, or alternatively to some auxiliary I/O devices 206. A device user may also compose data items, such as e-mail messages, using the keyboard 124 and/or some other auxiliary I/O device 206, such as a touchpad, a rocker switch, a thumb-wheel, a trackball, a touchscreen, or some other type of input device. The composed data items may then be transmitted over the wireless carrier network 270 via the communication subsystem 102.

In a voice communication mode, overall operation of the device is substantially similar to the data communication mode, except that received signals are output to the speaker 211, and signals for transmission are generated by a microphone 212. Alternative voice or audio I/O subsystems, such as a voice message recording subsystem, may also be implemented on the mobile communication device 100. In addition, the display 126 may also be utilized in voice communication mode, for example, to display the identity of a calling party, the duration of a voice call, or other voice call related information.

The short-range communications subsystem 204 enables communication between the mobile communication device 100 and other proximate systems or devices, which need not necessarily be similar devices. For example, the short-range communications subsystem may include an infrared device and associated circuits and components, or a Bluetooth™ communication module to provide for communication with similarly-enabled systems and devices.

It is sometimes the case that the fifth manufacturing facility 110E is not an entirely secure facility and a short time after a new product is assembled at the fifth manufacturing facility 110E and introduced to the public, counterfeit versions of the new product surface. Often the producers of the counterfeit versions acquire components of the new product from the fifth manufacturing facility 110E and reverse engineer the components so that their own manufacturing facilities may closely approximate the components of the new product. From the perspective of the consumer, or even the network on which the devices are deployed, the counterfeit versions of the new product may be indistinguishable from the new product.

For the producer of the new product, the loss of revenue attributable to the presence, in the market, of the counterfeit version, is related to the value of the intellectual property associated with the individual components. For the example case of the mobile communication device 100, the value of the intellectual property associated with the processor 128 may be primary among the totality of components. However, it should be understood that, in other example devices, the intellectual property associated with other components may have greater value.

Figure 3:
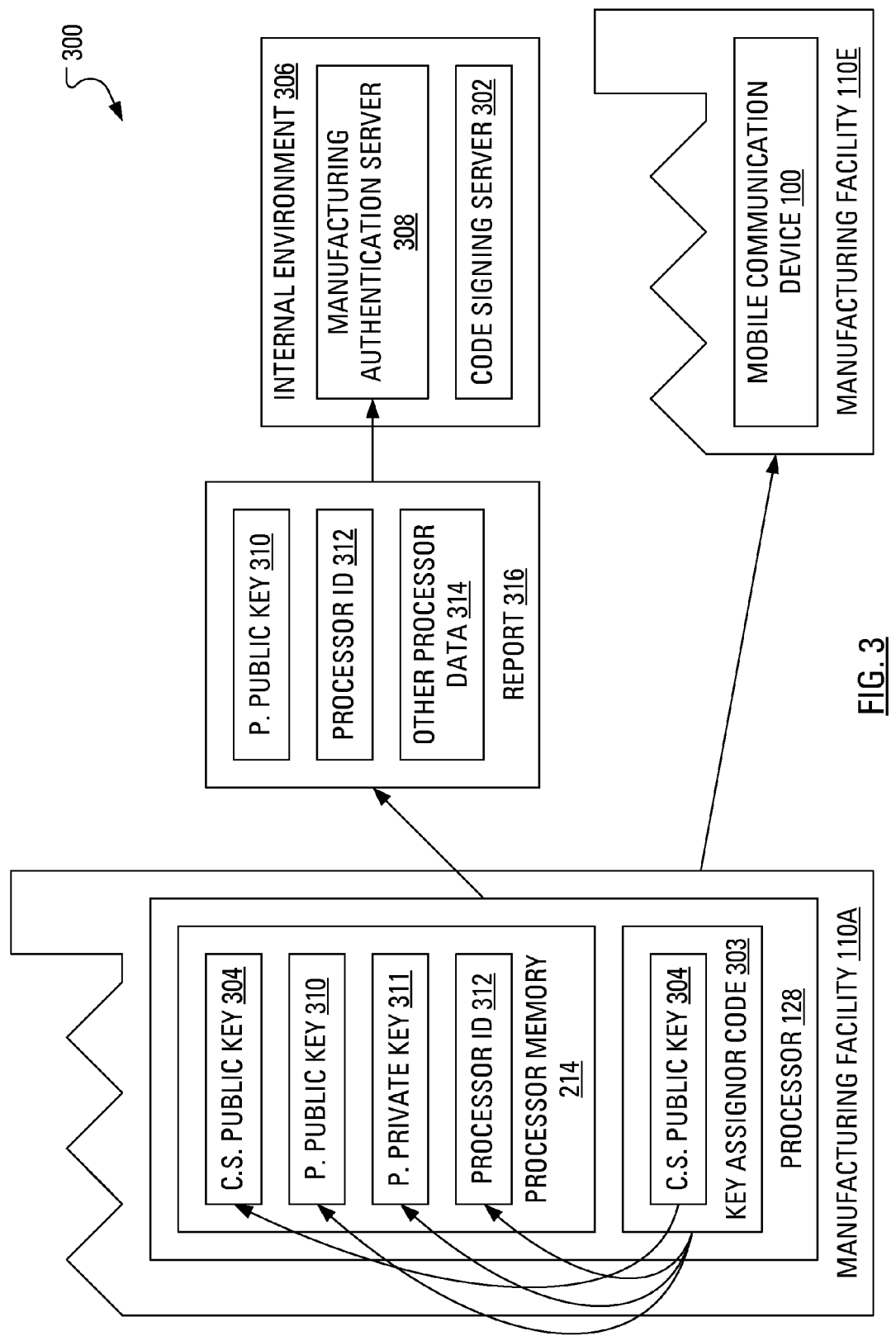
FIG. 3 illustrates components of a system for generating secure products, according to an implementation of the present disclosure.

FIG. 3 illustrates components of a system 300 for generating secure products. The system 300 includes an internal environment 306, the first manufacturing facility 110A and the fifth manufacturing facility 110E. The internal environment 306, so named because it is the environment internal to the organization that has contracted the manufacturing facilities 110A, 110B, 110C, 110D, 110E to produce the mobile communication device 100, includes a Manufacturing Authentication Server (MAS) 308 and a code signing server 302.

Figure 4:
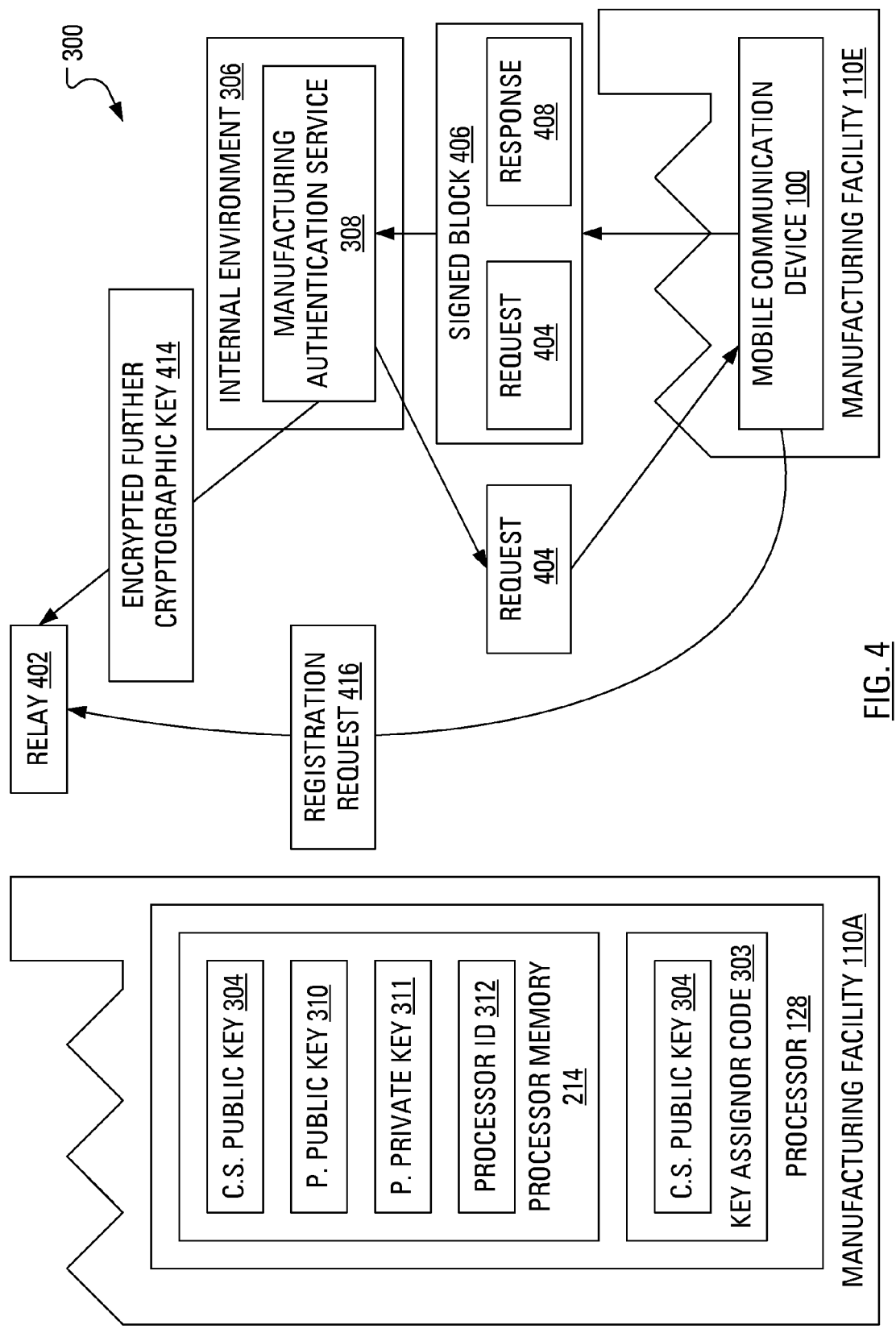
FIG. 4 illustrates the system of FIG. 3, for generating secure products with the addition of a relay, according to an implementation of the present disclosure.

FIG. 4 illustrates the system 300, of FIG. 3, for generating secure products with the addition of a relay 402 associated with the wireless carrier network 270.

In overview, by securing a component within a product, before the component is delivered to the final product manufacturing facility, the device manufacturing process can be made provably secure.

The processor 128 of the mobile communication device 100 may be specifically configured by the first manufacturing facility 110A before shipping the processor 128 to the fifth manufacturing facility 110E. For example, the processor 128 may be configured in such a way that the processor 128 will only execute appropriately signed software. Additionally, the processor 128 of the mobile communication device 100 may be configured in such a way that the processor 128 can appropriately respond to a cryptographic challenge. Furthermore, the processor 128 of the mobile communication device 100 may be configured in such a way that the processor 128 is locked down from further change or debug.

In operation, the processor 128 securely executes key assignor code 303 to generate an asymmetric key pair and an identifier for the processor 128 (a "processor ID" 312). The asymmetric key pair may, for example, include a processor private key 311 and a processor public key 310. The processor 128, while executing the key assignor code 303, may, for example, bind the asymmetric processor key pair 310, 311 to itself by storing, in the processor memory 214, the asymmetric processor key pair 310, 311 in conjunction with the processor ID 312 assigned to the processor 128. In addition to storing the asymmetric processor key pair 310, 311 and the processor ID 312 locally in the processor memory 214, the processor 128 also transmits a report 316 to the MAS 308 in the internal environment 306. The report 316, for example, includes the processor ID 312, the processor public key 310 and additional security characteristic data relating to security settings of the processor 128. The MAS 308 provides secure data storage and management within the internal environment 306.

The key assignor code 303 executed by the processor 128 at the first manufacturing facility 110A may initialize a "Secure Boot" feature of the processor 128 by providing the code signing public key 304 to the processor 128. In conjunction with providing the code signing public key 304 to the processor 128, the first manufacturing facility 110A may configure the processor 128 so that only executable code that has been signed using the code signing private key corresponding to the code signing public key 304 can be executed by the processor 128. Furthermore, the first manufacturing facility 110A may configure the processor 128 so that the processor 128 is locked from future alteration.

One manner in which the first manufacturing facility 110A may lock the processor 128 from future alteration comprises configuring the processor 128 so that each bit of the processor private key 311 is associated with a one-time programmable (OTP) fuse. That is, the processor memory 214 may be implemented as OTP fuses.

The first manufacturing facility 110A may also disable debug interfaces of the processor 128 to prevent circumvention of the Secure Boot feature or access to the processor private key 311.

Upon completion of manufacturing and configuring the processor 128, the first manufacturing facility 110A may arrange shipment of the processor 128 to the fifth manufacturing facility 110E.

At the fifth manufacturing facility 110E, the mobile communication device 100 may be assembled to include the processor 128 and other components. Upon successful assembly, the mobile communication device 100 may be shipped, by the fifth manufacturing facility 110E, to the market.

In conjunction with the mobile communication device 100 being shipped to the market, the MAS 308 may configure the relay 402 to allow secure communication between the mobile communication device 100 and the relay 402. Communicating with the relay may, for example, be required for secure transmission of messages from and reception of messages to the mobile communication device 100.

The processor 128 may be tested during manufacturing of the mobile communication device 100 at the fifth manufacturing facility 110E. Such testing may involve requiring the processor 128 to correctly generate a response to a given challenge. Generation of a correct response, as will be described hereinafter, may be considered evidence that the device being manufactured is secure. For the device being manufactured to be considered secure, it should be confirmable that security validation steps in the production flow have not been skipped or otherwise tampered with. In an example secure manufacturing process, a step to cryptographically verify the identity of each processor is included.

In addition to testing the processor 128 at stages of the manufacturing process, an operating system arranged for execution on the processor 128 may be configured to only execute signed applications.

In general, the processor 128 may be configured to support the execution of applications and support, where appropriate, the applications accessing Application Programming Interfaces (APIs) for the mobile communication device 100. The operating system may include a security handler element.

Each application executed by the processor 128 may be required to be a secure application. Ensuring that executing a secure application does not violate a defined security policy may involve determining that the application has been signed with a suitable signature. Such determining can happen at various times, for example, during boot-up or on-the-fly.

During boot-up, the security handler can analyze the application, as well as any other applications that have been loaded onto a device. The security handler can verify, in a manner to be discussed hereinafter, that the application has been appropriately cryptographically signed.

The security handler may, for example, access the code signing public key 304. In general, application developers submit a request, specific to a given application, to the internal environment 306 of the organization that has contracted the production of the mobile communication device 100. Responsive to the request, and assuming the requested is granted, the code signing server 302 of the internal environment 306 signs the given application with the code signing private key.

To cryptographically sign application code, the code signing server 302 may, first, provide the code of the given application as input to a hash function to obtain a digital signature. Subsequently, the code signing server 302 may encode the digital signature using the code signing private key. The code signing server 302 may then append the encoded digital signature, which may be called a cryptographic signature or cryptographic identifier ("ID"), to the application file.

Later, the given application is loaded onto the mobile communication device 100. At boot, the security handler may obtain, perhaps from a predetermined memory location, the code of the given application and one of the cryptographic IDs that are associated with the given application. The security handler may then provide the code of the given application as input to the same hash function used by the code signing server 302. As a result of providing the application code to the hash function, the security handler receives a local digital signature as the output of the hash function. The security handler then checks the local digital signature with the code signing public key 304 to confirm that the same hash of the code was signed by the internal environment 306. If the security handler confirms that the same hash of the code was signed by the internal environment 306, then the security handler allows the processor to execute the application. If the security handler fails to confirm that the same hash of the code was signed by the internal environment 306, then the security handler denies the processor 128 the ability to execute the application.

At any point in the manufacturing process, the MAS 308 may generate a challenge that is specific to the processor 128 and transmit the challenge to the mobile communication device 100. The MAS 308 may generate the challenge in such a way that the response is verifiable, by the MAS 308, and may only be generated by the mobile communication device 100 if the installed processor is the processor 128 that has been securely configured by the first manufacturing facility 110A.

A simple challenge-response mechanism that allows the MAS 308 to confirm that the processor 128 has possession of the processor private key 311 proceeds as follows. The MAS 308 generates some random data and sends the random data to the mobile communication device 100. The mobile communication device 100 signs the random data with the processor private key 311 and sends the signed data to the MAS 308. The MAS 308 validates the signed data using the processor public key 310.

An alternate mechanism that allows the MAS 308 to confirm that the processor 128 has possession of the processor private key 311 proceeds as follows. The MAS 308 encrypt some random data with the processor public key 310, thereby generating encrypted random data. The MAS 308 transmits the encrypted random data to the mobile communication device 100. Responsive to receiving the encrypted random data, the mobile communication device 100 performs a decryption, using the processor private key 311 to obtain the random data. The mobile communication device 100 then transmits, to the MAS 308, the random data. Upon receiving the random data correctly decrypted, the MAS 308 may be confident that the processor 128 possesses the processor private key 311.

Upon failing to validate the signed data, or upon receiving incorrectly decrypted random data, the MAS 308 may arrange that the mobile communication device 100 be blocked from being shipped from the fifth manufacturing facility 110E. In conjunction with being blocked from being shipped from the fifth manufacturing facility 110E, the MAS 308 may also arrange that the mobile communication device 100 is not activated on the relay 402. That is, the MAS 308 may passively not configure the relay 402 for secure communication with the mobile communication device 100.

Upon failing to validate the signed data, or upon receiving incorrectly decrypted random data, the MAS 308 may actively arrange that the mobile communication device 100 be blocked from communicating with the relay 402.

In view of FIG. 4, for additional security, the mobile communication device 100 may generate a further cryptographic key. The processor 128 may independently initiate the generation of the further cryptographic key. However, in another case, the processor 128 initiates the generation of the further cryptographic key responsive to a request 404 from the MAS 308.

Perhaps as part of a test of the security of the mobile communication device 100, the MAS 308 may transmit the request 404 to collect an authenticated set of data from the mobile communication device 100. If the further cryptographic key has not yet been generated at time of the receipt of the request 404 at the mobile communication device 100, the processor 128 initiates the generation of the further cryptographic key.

Responsive to the request 404, the processor 128 may encrypt the further cryptographic key to form an encrypted further cryptographic key 414. For the encrypting, the mobile communication device 100 may use a public key associated with the relay 402. The processor 128 may then form a signed block 406. The signed block 406 includes the request 404 and a response 408 to the request 404. The response 408 contains an indication of device identity and the encrypted further cryptographic key 414. The processor 128 may then sign, with the processor private key 311, the block containing the request 404 and the response 408 so that the mobile communication device 100 may then transmit the signed block 406 to the MAS 308. In turn, the MAS 308 may forward the encrypted further cryptographic key 414 to the relay 402. Because the further cryptographic key 414 has been encrypted using the public key associated with the relay 402, the relay 402 can decrypt the encrypted further cryptographic key 414 to produce the further cryptographic key specific to the mobile communication device 100.

Later, the mobile communication device 100 may transmit a request 416 to the relay 402 to register therewith. The mobile communication device 100 can utilize a further cryptographic key in the registration request, thereby allowing the relay 402 to use its foreknowledge of the further cryptographic key to confirm that the registration request has originated at the mobile communication device 100. The further cryptographic key may be a symmetric key or an asymmetric key pair.

A typical challenge/response mechanism will merely validate that the authenticating device (e.g., the processor 128) is in possession of a specific private key (i.e., the processor private key 311). It is not, generally, possible to validate the operation of, or integrity of, the software to be executed on the authenticating device. A rogue authenticating device may, for example, be in possession of the processor private key 311 after having stolen the processor private key 311 from the processor 128.

Figure 5:
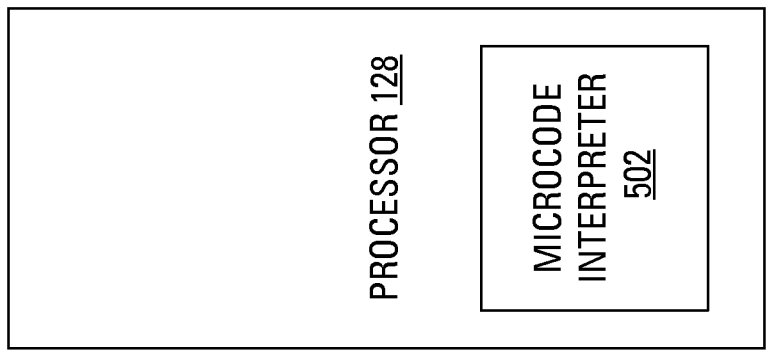
FIG. 5 illustrates the processor from the mobile communication device of FIG. 1 with an addition of a microcode interpreter.

In a countermeasure to such processor private key theft, it is proposed herein to augment the processor 128, as illustrated in FIG. 5, to contain a microcode interpreter 502.

The simple challenge/response mechanism outlined above may be altered as follows. The MAS 308 generates a block of microcode, encrypts the block of microcode and sends a challenge that includes the encrypted microcode to the mobile communication device 100.

FIG. 6 illustrates example steps in a method of generating a response to a challenge. Software on the processor 128 of the mobile communication device 100 receives (step 602) the challenge and passes (step 604) the encrypted block of microcode to the microcode interpreter 502. The microcode interpreter 502 decrypts the microcode and executes the microcode. Indeed, the microcode would have access to the software memory space and hardware configuration of the mobile communication device 100 so that the authenticity and operation of the mobile communication device 100 could be independently validated.

Upon having executed the microcode, the microcode interpreter 502 returns a result of the execution of the microcode so that the software on the processor 128 receives (step 606) the result. Based on the result, the processor 128 generates (step 608) a response to the challenge. The processor 128 then encrypts the response and transmits (step 610) the encrypted response to the MAS 308.

Conveniently, by arranging that the microcode be decrypted and executed entirely within the hardware, it has been considered that any tampering by potentially abusive device software may be prevented.

Because the challenge consists of microcode that requires interpretation, complex, or even state-based, challenge/response mechanisms are possible.

In one example, the microcode may validate the identity of the processor 128.

In another example, the microcode may validate the software on the processor 128.

In a further example, the microcode may validate data available to the processor 128.

In still further examples, the microcode may function to: reorder a chain of encrypted data; perform a functional computation on data available to the processor 128; or recall a sequence of data that has been previously sent to the mobile communication device 100.

In an even further example, a given challenge can contain encrypted data and instructions to maintain the encrypted data for future use in generating a response to a subsequent challenge. The processor public key 310 may be used to encrypt the data.

The above-described implementations of the present application are intended to be examples only. Alterations, modifications and variations may be effected to the particular implementations by those skilled in the art without departing from the scope of the application, which is defined by the claims appended hereto.

What is claimed is:

1. A method of responding to a challenge at a device, said method comprising:

receiving an unsolicited challenge from an authentication server, said challenge including an encrypted block of microcode, said unsolicited challenge requiring no previous communication from the device to the authentication server;

passing said encrypted block of microcode to a microcode interpreter, thereby allowing:

decryption, by said microcode interpreter, of said encrypted block of microcode to form decrypted microcode; and execution, by said microcode interpreter, of said decrypted microcode, where said execution of said decrypted microcode includes accessing a software memory space of said device;

receiving a result of said execution of said decrypted microcode;

based on said result, generating a response; and transmitting said response to said authentication server.

2. The method as claimed in claim 1 further comprising encrypting said response.

3. The method as claimed in claim 1 wherein said microcode functions to validate an identity of a processor.

4. The method as claimed in claim 1 wherein said microcode functions to validate software on a processor.

5. The method as claimed in claim 1 wherein said microcode functions to validate data available to a processor.

6. The method as claimed in claim 1 wherein said microcode functions to reorder a chain of encrypted data.

7. The method as claimed in claim 1 wherein said microcode functions to perform a functional computation on data available to a processor.

8. The method as claimed in claim 1 wherein said microcode functions to recall a sequence of data.

9. The method as claimed in claim 1 wherein said challenge comprises encrypted data and instructions to maintain said encrypted data for future use in generating a response.

10. A device comprising:

a software memory space;

a processor including a microcode interpreter, said processor configured to:

receive an unsolicited challenge from an authentication server, said challenge including an encrypted block of microcode, said unsolicited challenge requiring no previous communication from the device to the authentication server;

pass said encrypted block of microcode to said microcode interpreter;

said microcode interpreter configured to:

decrypt said encrypted block of microcode to form decrypted microcode; and execute said decrypted microcode, where said execution of said decrypted microcode includes:

accessing said software memory space; and returning, to said processor, a result;

said processor further configured to:

receive said result;

generate, based on said result, a response; and transmit said response to said authentication server.

11. A non-transitory computer readable medium containing computer-executable instructions that, when performed by processor of a device, said processor including a microcode interpreter, cause said processor to:

receive an unsolicited challenge from an authentication server, said challenge including an encrypted block of microcode, said unsolicited challenge requiring no previous communication from the device to the authentication server;

pass said encrypted block of microcode to said microcode interpreter, thereby allowing:
- decryption, by said microcode interpreter, of said encrypted block of microcode to form decrypted microcode; and
- execution, by said microcode interpreter, of said decrypted microcode, where said execution of said decrypted microcode includes accessing a software memory space of said device;

receive a result of said execution of said decrypted microcode;

generate, based on said result, a response; and transmit said response to said authentication server.

12. The non-transitory computer readable medium as claimed in claim 11 wherein the instructions further cause the processor to encrypt said response.

13. The non-transitory computer readable medium as claimed in claim 11 wherein said microcode functions to validate an identity of a processor.

14. The non-transitory computer readable medium as claimed in claim 11 wherein said microcode functions to validate software on a processor.

15. The non-transitory computer readable medium as claimed in claim 11 wherein said microcode functions to validate data available to a processor.

16. The non-transitory computer readable medium as claimed in claim 11 wherein said microcode functions to reorder a chain of encrypted data.

17. The non-transitory computer readable medium as claimed in claim 11 wherein said microcode functions to perform a functional computation on data available to the processor.

18. The non-transitory computer readable medium as claimed in claim 11 wherein said microcode functions to recall a sequence of data.

19. The non-transitory computer readable medium as claimed in claim 11 wherein said challenge comprises encrypted data and instructions to maintain said encrypted data for future use in generating a response.

* * * * *